United States Patent Office 3,150,139
Patented Sept. 22, 1964

3,150,139
N-METHYLPIPERAZINOCYCLOHEXANOL
DERIVATIVES
Seymour L. Shapiro, Hastings on Hudson, Louis Freedman, Bronxville, and Harold Soloway, New Rochelle, N.Y., assignors to U.S. Vitamin & Pharmaceutical Corporation, New York, N.Y., a corporation of Delaware
No Drawing. Filed May 17, 1961, Ser. No. 110,634
2 Claims. (Cl. 260—268)

This invention is concerned with a series of N-methylpiperazino and N-methylhomopiperazinocyclohexanols which are relatively non-toxic and are effective as oral bronchodilator agents in the absence of central nervous system and cardiovascular side reactions.

By contrast to bronchodilator agents familiarly used in the art, the compounds of this invention do not have any aryl rings and, in particular, do not have the pyroatechol structure.

The compounds of this invention have the following formula:

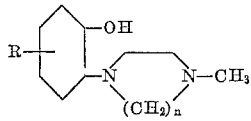

wherein R is hydrogen, lower alkyl, vinyl, or cyano, and $n$ is an integer which may be varied as 2 or 3.

The preferred structures have R as hydrogen and $n$ as 2 or 3, and particularly 3.

Replacement of the N-methyl group on the piperazino or homopiperazino group by higher alkyl structures, or by hydrogen, gives compounds which are characterized by greater toxicity or lessened, or no bronchodilator activity.

Alternatively, substitution in the cyclohexyl ring, as for example, with a vinyl group, is characterized by retention of bronchodilator activity.

The compound where $n=2$ has been previously disclosed as an intermediate by Shapiro et al., U.S. Patent 2,954,380, although therein this compound was not obtained, nor described, nor required in pure crystalline form. It is in the pure crystalline form of the compound that the now disclosed novel utility as a bronchodilator has been ascertained.

The compounds of this invention are strong bases and accordingly mono or di-acid salts may be prepared, although the mono salts are preferred. Thus, for example, salts are conveniently obtained from the non-toxic mineral acids such as hydrochloric, hydrobromic, sulfuric, and nitric acid, from the organic acids such as, for example, fumaric, malic, tartaric, citric and the like, and from the acidic xanthines such as theophylline and 8-chlorotheophylline. On treatment with organic derivatives of the strong mineral acids such as methyl iodide and ethyl bromide, quaternary salts may be obtained.

Although not unequivocally established, it is likely that the most basic of the two nitrogens is the methyl bearing nitrogen, and the mono acid, and quaternary salts undoubtedly form here.

The compounds of this invention are readily obtained by condensation of N-methylpiperazine or N-methylhomopiperazine with the appropriately substituted cyclohexene oxide.

When R is other than hydrogen as, for example, when employing 4-vinylcyclohexene oxide, the structural assignment was not made with certainty and the compounds are tentatively shown as below, with the vinyl group in the 4 or 5 position:

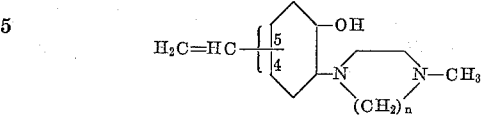

Similar provisional structural assignments are indicated in those instances wherein R is cyano, or lower alkyl.

Examples typifying the compounds of this invention which are in no way limiting are given below.

EXAMPLE 1

2-(4-Methylhomopiperazinyl)-1-Cyclohexanol

A mixture of 39.2 g. (0.04 mole) cyclohexene oxide and 45.0 g. (0.04 mole) N-methylhomopiperazine was heated under reflux in a bath maintained at 150–155° over 14 hours. Distillation yielded 78 g. (92%), B.P. 96–98 (0.11 mm.). $N_D^{20}=1.5002$.

Analysis.—Calcd. for $C_{12}H_{24}N_2O$: C, 67.9; H, 11.4; N, 13.2. Found: C, 67.8; H, 11.6; N, 12.9.

Upon reaction with fumaric acid, the di-fumaric acid salt, M.P. 147–148° (acetonitrile) was obtained.

Analysis.—Calcd. for $C_{20}H_{32}N_2O_9$: C, 54.0; H, 7.3; N, 6.3. Found: C, 54.2; H, 6.8; N, 6.2.

EXAMPLE 2

2-(4-Methylpiperazinyl)-1-Cyclohexanol

A mixture of 150 g. (1.5 mole) of 1-methylpiperazine and 96 g. (1.0 mole) of cyclohexene oxide was refluxed for 12 hours and then distilled to give 100 g. of low boiling side products and reactants at 55–60° (40 mms.), followed by 121 g. (61%) of product, B.P. 117–120°, at 1.5 mms. On standing the distillate solidified and was recrystallized (pentane) to give the product, M.P. 46–47°.

Analysis.—Calcd. for $C_{11}H_{22}N_2O$: C, 66.6; H, 11.2; N, 14.1. Found: C, 66.4; H, 11.3; N, 13.8.

Upon treatment with one equivalent of hydrogen chloride in methanol, the hydrochloride of the product is obtained.

EXAMPLE 3

4 (or 5)-Vinyl-2-(4-Methylpiperazinyl)-1-Cyclohexanol

N-methylpiperazine (4.0 g., 0.04 mole) was brought to reflux and 5.0 g. (0.04 mole) of 3,4-epoxy-1-vinylcyclohexane added over 10 minutes. Heating was continued for a total of 6 hours, slowly raising the bath temperature to 175° after reflux ceased (2½ hours). Distillation then yielded 5.6 g. (62%) of product, B.P. 92–96° (0.08 mms.).

Analysis.—Calcd. for $C_{13}H_{24}N_2O$: C, 69.6; H, 10.8; N, 12.5. Found: C, 70.4; H, 11.4; N, 11.8.

EXAMPLE 4

4 (or 5)-Cyano-2-(4-Methylpiperazinyl)-1-Cyclohexanol

A mixture of 36.9 g. (0.03 mole) of 3,4-epoxycyclohexane carbonitrile and 30.0 g. (0.3 mole) of N-methylpiperazine were heated together at an internal temperature of 150–162° for 3 hours. The solid mass which resulted on cooling was recrystallized (hexane) to yield 38.1 g. (58%) of product, M.P. 88–89°.

Analysis.—Calcd. for $C_{12}H_{21}N_3O$: C, 64.5; H, 9.5. Found: C, 64.4; H, 9.3.

The compounds of this invention are preferably administered orally in the form of tablets and capsules containing 20–100 mg. of active ingredient prepared in the conventional manner or in sustained release forms, as well as elixers, suspensions and other similar pharmaceutical dosage forms. For parenteral administration, the compounds, desirably as their hydrochloric acid salts, may be incorporated in solution, in a non-toxic vehicle and sterilized, preferably by filtration. In addition, the compounds can be formulated as an inhalation aerosol or provided in a form for dispensing by atomizers, nebulizers, and similar devices.

To establish the effectiveness of the compounds of this invention, the following tests were employed.

Guinea pigs of either sex are selected on the basis of sensitivity (demonstrated by collapse) to exposure to aqueous 0.2% histamine aerosol under standard conditions for 3–5 minutes. Sensitive animals are allowed to recover for 2–4 hours. At the end of the recovery period, test compound is administered, either orally or subcutaneously, and 90 minutes later the pigs are re-exposed to the aerosol. Those pigs not collapsing in 5 minutes are considered protected. Six pigs are studied per dose level and the dosage level plotted against the percent of pigs protected, and the effective dose providing 50% protection ($ED_{50}$) is established.

In another test, fed and watered guinea pigs of either sex are selected on the basis of sensitivity (manifested by collapse in 5 minutes) to exposure to an aerosol of 1% acetylcholine bromide in saline at 5.8 lbs./in.$^2$ (300 mm. Hg) driving pressure in a suitable chamber. Sensitive animals are allowed to recover for 2–4 hours. At the end of this time test drug is administered by the desired route and 90 minutes later the pigs are re-exposed to acetylcholine bromide aerosol in the chamber under the standardized conditions. Those pigs which do not collapse within 5 minutes are considered protected. Six pigs are studied per dose level, and results are established as described above for the histamine test.

Supplementing such procedures, a variety of standard test procedures indicated that the compounds of this invention were relatively non-toxic, and without the undesirable cardiovascular, and central nervous system side effects.

Extensive testing data shown for 2-(4-methylpiperazinyl)-1-cyclohexanol (Compound A) and 2-(4-methylhomopiperazinyl)-1-cyclohexanol (Compound B) substantiate the important target activity of these compounds, and especially significant is their freedom from side effects.

Thus the table and descriptive data below summarizes the findings.

BRONCHODILATOR PROPERTIES

| Test | Route | Compound A, mg./kg. | Compound B, mg./kg. |
|---|---|---|---|
| $ED_{50}$ histamine | S.C. | 35 | 80 |
| Do | Oral | 61 | 80 |
| $ED_{50}$ acetylcholine | do | 95 | 88 |
| $LD_{50}$ mouse | S.c. | 1,490 | 1,550 |
| Do | Oral | 1,400 | 1,700 |
| $LD_{50}$ guinea pig | do | 1,410 | 940 |
| Therapeutic index: | | | |
| Histamine | do | 23.0 | 11.8 |
| Acetylcholine | do | 14.8 | 10.7 |

Compound A was inactive in the following pharmacological tests after oral administration: central nervous system excitation and depression (at 30 and 60 mg./kg.), anticonvulsant (at 250 and 500 mg./kg.), analgesic (at 60 and 75 mg./kg.). Topical application of 20 mg./ml. to the guinea pig eye had no local anesthetic effect. Application of 20 micrograms/ml. on isolated guinea pig heart had no effect.

Injected intravenously to anesthetized dogs, it had no effect on blood pressure, heart rate or respiration and did not influence the effect of subsequent injections of adrenaline or acetylcholine.

Addition of Compound A to isolated guinea pig ileum at 40 $\mu$g./ml. had no effect but the same concentration on rat uterus produced an abolition of the acetylcholine response.

Compound B was inactive in the following pharmacological tests under oral administration: central nervous excitant and depressant effect (at 40 and 80 mg./kg.), anticonvulsant (at 250 and 500 mg./kg.), muscle relaxant (at 100 mg./kg.), analgesic (at 100 mg./kg.). Test on guinea pig eye at 20 mg./ml. showed no local anesthetic effect.

Injected intravenously to anesthetized dogs, it showed no significant effect on blood pressure, heart rate or respiration. There was no modification of the responses to adrenaline, acetylcholine or histamine.

Added to isolated guinea pig ileum ($\mu$g./ml.) Compound B produced no contraction but blocked the effect of histamine. On rat uterus, it caused contraction and a slight and variable modification of the acetylcholine response.

It is to be understood that the invention is not to be limited to the exact details of operation or exact compounds shown and described as obvious modifications and equivalents will be apparent to one skilled in the art and the invention is, therefore, to be limited only by the scope of the appended claims.

We claim:
1. The compound

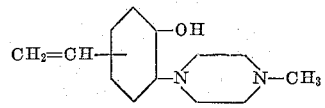

2. The compound

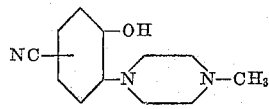

References Cited in the file of this patent
UNITED STATES PATENTS

| | | |
|---|---|---|
| 2,804,422 | Schumann et al. | Aug. 27, 1957 |
| 2,877,156 | Janssen et al. | Mar. 10, 1959 |
| 2,954,380 | Shapiro et al. | Sept. 27, 1960 |
| 2,976,290 | Parcell | Mar. 21, 1961 |
| 3,021,333 | Reisner et al. | Feb. 13, 1962 |

OTHER REFERENCES

Elderfield: Heterocyclic Compounds, vol. 6, page 428, John Wiley & Sons, Inc., New York (1957), QD 400.E4.

Shapiro et al.: Journal American Chemical Society, vol. 81, pp. 3993–3996 (1959).